United States Patent
Adams

(10) Patent No.: US 9,579,773 B2
(45) Date of Patent: Feb. 28, 2017

(54) CONTROL LOOP FOR ABRASIVE RECYCLING SYSTEM

(71) Applicant: ZULUBOY, INC., Kent, OH (US)

(72) Inventor: Benjamin Adams, Cuyahoga Falls, OH (US)

(73) Assignee: Zuluboy, Inc., Kent, OH (US)

( * ) Notice: Subject to any disclaimer, the term of this patent is extended or adjusted under 35 U.S.C. 154(b) by 0 days.

(21) Appl. No.: 14/815,744

(22) Filed: Jul. 31, 2015

(65) Prior Publication Data

US 2017/0028527 A1    Feb. 2, 2017

(51) Int. Cl.
*B24C 9/00*    (2006.01)
*B24C 1/04*    (2006.01)

(52) U.S. Cl.
CPC .............. *B24C 9/006* (2013.01); *B24C 1/045* (2013.01)

(58) Field of Classification Search
CPC ................................ B24C 9/006; B24C 1/045
USPC .......................................................... 451/56
See application file for complete search history.

(56) References Cited

U.S. PATENT DOCUMENTS

| | | |
|---|---|---|
| 2,347,334 A | 4/1944 | Schmieg |
| 3,149,445 A | 9/1964 | Nolan |
| 3,824,738 A | 7/1974 | Hall et al. |
| 3,863,394 A | 2/1975 | Dumentat |
| 3,865,629 A | 2/1975 | Dankoff et al. |
| 3,913,271 A | 10/1975 | Boettcher |
| 4,120,121 A | 10/1978 | Surman |
| 4,671,708 A | 6/1987 | Hurd |
| 4,702,042 A | 10/1987 | Herrington et al. |
| 4,704,823 A | 11/1987 | Steinback |
| 4,719,721 A | 1/1988 | Stump |
| 4,800,063 A | 1/1989 | Mierswa et al. |
| 4,827,678 A | 5/1989 | MacMillan et al. |
| 4,943,368 A | 7/1990 | Gilbert et al. |
| 5,071,541 A | 12/1991 | Thompson |
| 5,231,804 A | 8/1993 | Abbott |
| 5,527,204 A * | 6/1996 | Rhoades ................. B24C 1/045 451/39 |
| 5,595,461 A | 1/1997 | Miller |
| 5,637,029 A | 6/1997 | Lehane |
| 5,799,643 A * | 9/1998 | Miyata ................... B28D 5/007 125/21 |
| 5,911,959 A | 6/1999 | Wold et al. |
| 6,090,197 A * | 7/2000 | Vivian .................... B24C 9/006 106/739 |
| 6,120,351 A | 9/2000 | Zeng |
| 6,361,416 B1 * | 3/2002 | Hopkins ................. B24C 1/045 210/767 |

(Continued)

OTHER PUBLICATIONS

Office action dated Aug. 11, 2016 from U.S. Appl. No. 14/815,712, filed Jul. 31, 2015.

*Primary Examiner* — George Nguyen
(74) *Attorney, Agent, or Firm* — Sunstone IP

(57) ABSTRACT

An automatically adjustable abrasive recycling system is provided. The abrasive recycling system includes one or more sensors configured to sense at least one characteristic of the abrasive recycling system, and slurry supply mechanism that operates, at least in part, based upon the sensed characteristic to control the operation of the abrasive recycling system. Methodology corresponding to the automatic operation of the abrasive recycling system is also provided.

22 Claims, 5 Drawing Sheets

(56) References Cited

U.S. PATENT DOCUMENTS

| | | | |
|---|---|---|---|
| 6,362,103 B1 * | 3/2002 | Watts | B24B 37/04 |
| | | | 438/691 |
| 6,372,111 B1 * | 4/2002 | Watts | B24B 37/04 |
| | | | 204/267 |
| 6,461,524 B1 * | 10/2002 | Tsuihiji | B01D 25/164 |
| | | | 210/745 |
| 6,805,618 B1 * | 10/2004 | Ward | B24C 9/006 |
| | | | 451/87 |
| 7,282,074 B1 | 10/2007 | Witter | |
| 7,585,201 B2 | 9/2009 | Kanai et al. | |
| 7,775,854 B1 * | 8/2010 | Boman | B24B 55/12 |
| | | | 451/8 |
| 8,147,293 B2 * | 4/2012 | Hashish | B24C 1/045 |
| | | | 451/38 |
| 8,771,040 B1 | 7/2014 | Lyras | |
| 9,022,835 B1 | 5/2015 | Gus | |
| 2003/0092364 A1 * | 5/2003 | Erickson | B24C 1/045 |
| | | | 451/75 |
| 2007/0218808 A1 * | 9/2007 | Shimizu | B24C 9/003 |
| | | | 451/5 |
| 2008/0014837 A1 * | 1/2008 | Fujinaga | B24C 1/04 |
| | | | 451/28 |
| 2014/0045409 A1 | 2/2014 | Zhang et al. | |

* cited by examiner

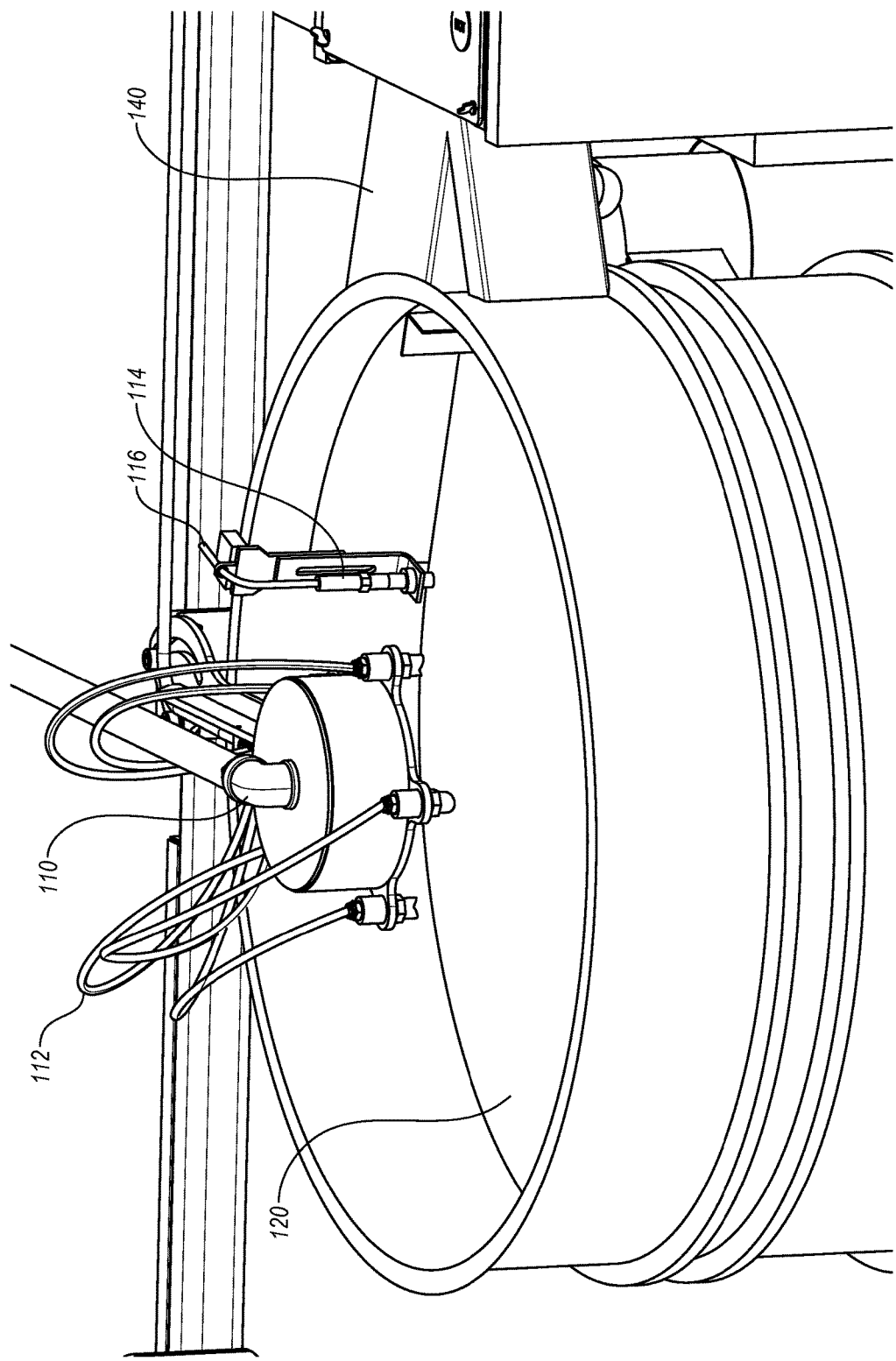

CONTROL LOOP FOR ABRASIVE RECYCLING SYSTEM

BACKGROUND

Abrasive jet cutting, such as waterjet cutting, is often used during fabrication of a work piece, such as a machine part, and is especially useful when the materials being cut are sensitive to the high temperatures generated by other cutting methods. It is desirable to recycle the abrasive material used by abrasive jet cutting machines. When using an abrasive recycling system, a trained operator may need to closely observe the recycling system in order to determine what changes may be required to achieve a desired outcome. Furthermore, the operator often relies on visual inspection methods to gauge the effectiveness of the recycling system. Generally, the operator would then make adjustments to the recycling system in an attempt to increase the recycling system's efficiency. The visual method of inspection is useful, but can lead to errors and inefficiencies. Thus, a need exists for a more efficient abrasive recycling system that is easier to use with little to no input from an operator.

SUMMARY

A described aspect provides a liquid jet abrasive recycling system that will adjust a feature of the recycling system based on one or more sensed characteristics of the recycling system. In one exemplary embodiment, the liquid jet abrasive recycling system may include a slurry supply mechanism associated with a liquid jet cutting tool, wherein the slurry supply mechanism is configured to control the input of slurry from the liquid jet cutting tool into the liquid jet abrasive recycling system. The abrasive recycling system may also include a dryer in fluid communication with the slurry supply mechanism, the dryer configured to remove liquid from the slurry, and a sensor monitoring at least one characteristic of the abrasive recycling system, the sensor being in electronic communication with the slurry supply mechanism, wherein the slurry supply mechanism operates, at least in part, based upon the at least one monitored characteristic.

BRIEF DESCRIPTION OF THE DRAWINGS

The described aspects are best understood from the following detailed description when read in connection with the accompanying drawing(s). Included in the drawing(s) are the following figure(s):

FIG. 4 is a perspective view of a portion of the abrasive recycling system.

DETAILED DESCRIPTION

Figure 1:
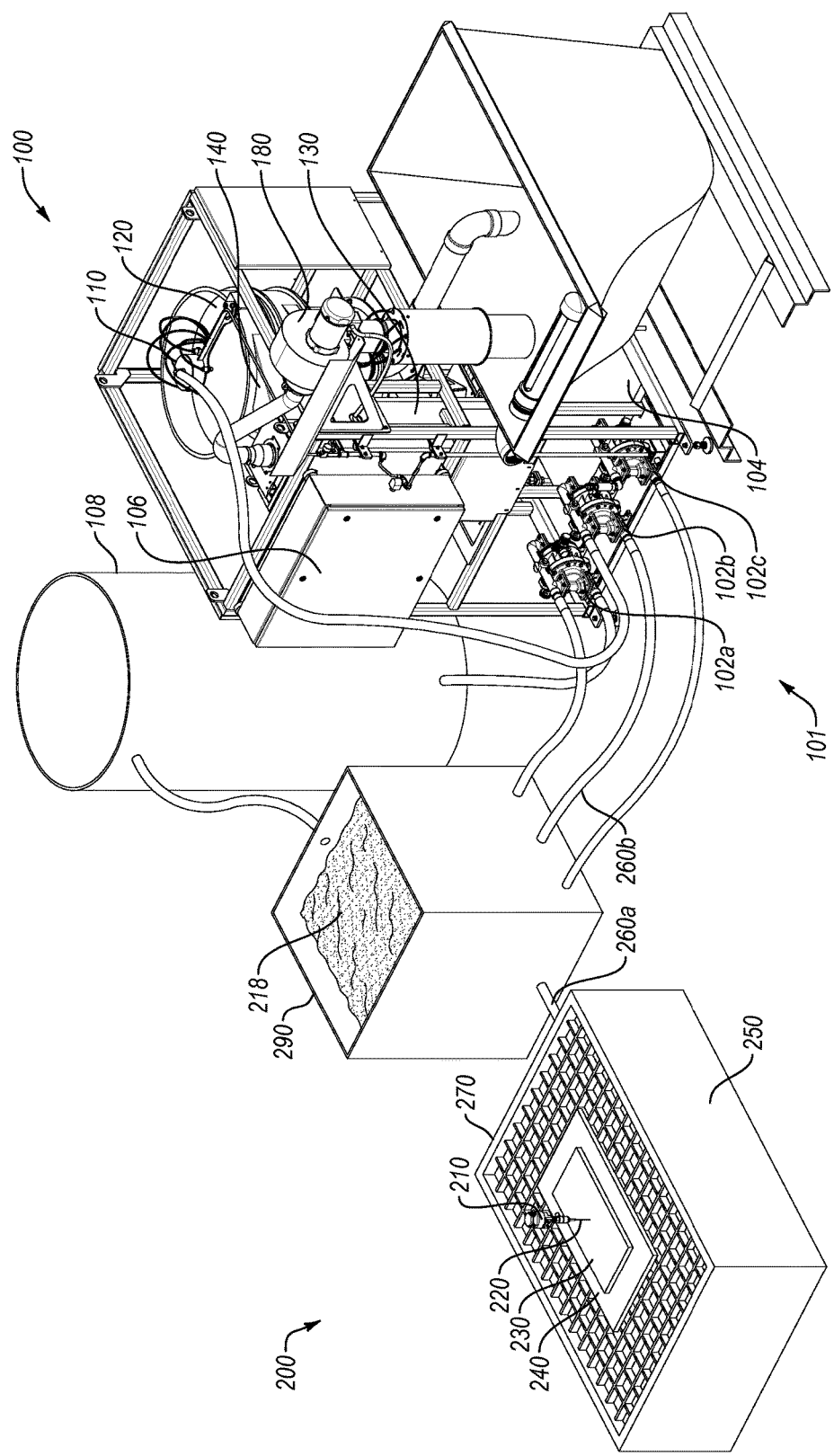
FIG. 1 is a perspective view of a liquid jet abrasive recycling system.

While this disclosure contains many specific details, it should be understood that various changes and modifications may be made without departing from the scope of the technology herein described and the appended claim(s). The scope of the technology shall in no way be construed as being limited to the number of constituting components, the corresponding relationship, if any, of constituting components, the materials thereof, the shapes thereof, the relative arrangement thereof, the temperature employed, the order of combination of constituents thereof, etc., and are disclosed simply as examples. The depictions and schemes shown herein are intended for illustrative purposes and shall in no way be construed as being limiting in the number of constituting components, connectivity, methodological steps, the materials thereof, the shapes thereof, the relative arrangement thereof, the order of system interactions thereof, etc., and are disclosed simply as an aid for understanding. The features and advantages of the described embodiments are illustrated in detail in the accompanying drawing(s), wherein like reference numerals refer to like elements throughout the drawing(s). As a preface to the detailed description, it should be noted that, as used in this specification and the appended claim(s), the singular forms "a", "an" and "the" include plural referents, unless the context clearly dictates otherwise.

With reference to the drawing(s), FIG. 1 depicts a perspective view of an abrasive recycling system 100 associated with a liquid jet machine 200. The liquid jet machine 200 can be a liquid jet cutting tool, such as a water jet machine, capable of removing material from a work piece 230 to create a desired form or part. Typically, a liquid jet machine 200 utilizes abrasive 220 to facilitate the removal of material, or in other words, to cut the work piece 230 to the desired shape.

In the illustrated embodiment, the liquid jet machine or cutting tool 200 can include a liquid jet 210 through which abrasive 220 is expelled onto the work piece 230 to remove material from the work piece 230. The expelled abrasive 220, along with portions of the work piece 230 and portions of a sacrificial underlayment 240, can be collected in a collection bin 250 thereby forming a used mixture 218. The used mixture 218 can be transported to the abrasive recycling system 100 by a transport hose 260, for example. Also, the used mixture 218 can be transported to abrasive recycling system 100 via an intermediate bin or collector 290, when the abrasive recycling system 100 and the liquid jet cutting tool 200 are in close proximity, such as in the same building, for example. In this example, the used mixture 218 can be transported to the bin 290 by, for example, a hose 260a. Then, another hose 260b can be connected to the bin 290 on one end and then on the other end be connected to the abrasive recycling system 100. In this manner, the abrasive recycling system 100 can be associated with the liquid jet cutting tool 200, and can be described as being on demand or real-time. Furthermore, the abrasive recycling system 100 is associated with the liquid jet cutting tool 200 when both are on site. It is contemplated, however, that once the used mixture 218 is positioned in the bin 290, the bin 290 does not need to be fluidly connected, such as by a hose for example, to the collection bin 250 in order to operate the abrasive recycling system 100. As used herein, the liquid jet cutting tool 200 can include the intermediate bin or collector 290.

The liquid jet cutting tool 200 can be various machines designed to expel abrasive sufficient to impact or otherwise erode a work piece. For example, in one embodiment, the liquid jet cutting tool 200 is a water jet machine. In another embodiment, the liquid jet cutting tool 200 can be an abrasive jet machine. Reference to the used mixture 218 will generally be referred to hereinafter as a slurry or an abrasive slurry, which implies a mixture of water and other material.

However, this reference does not limit the used mixture to only those that contain water, as the case may be.

Figure 3:
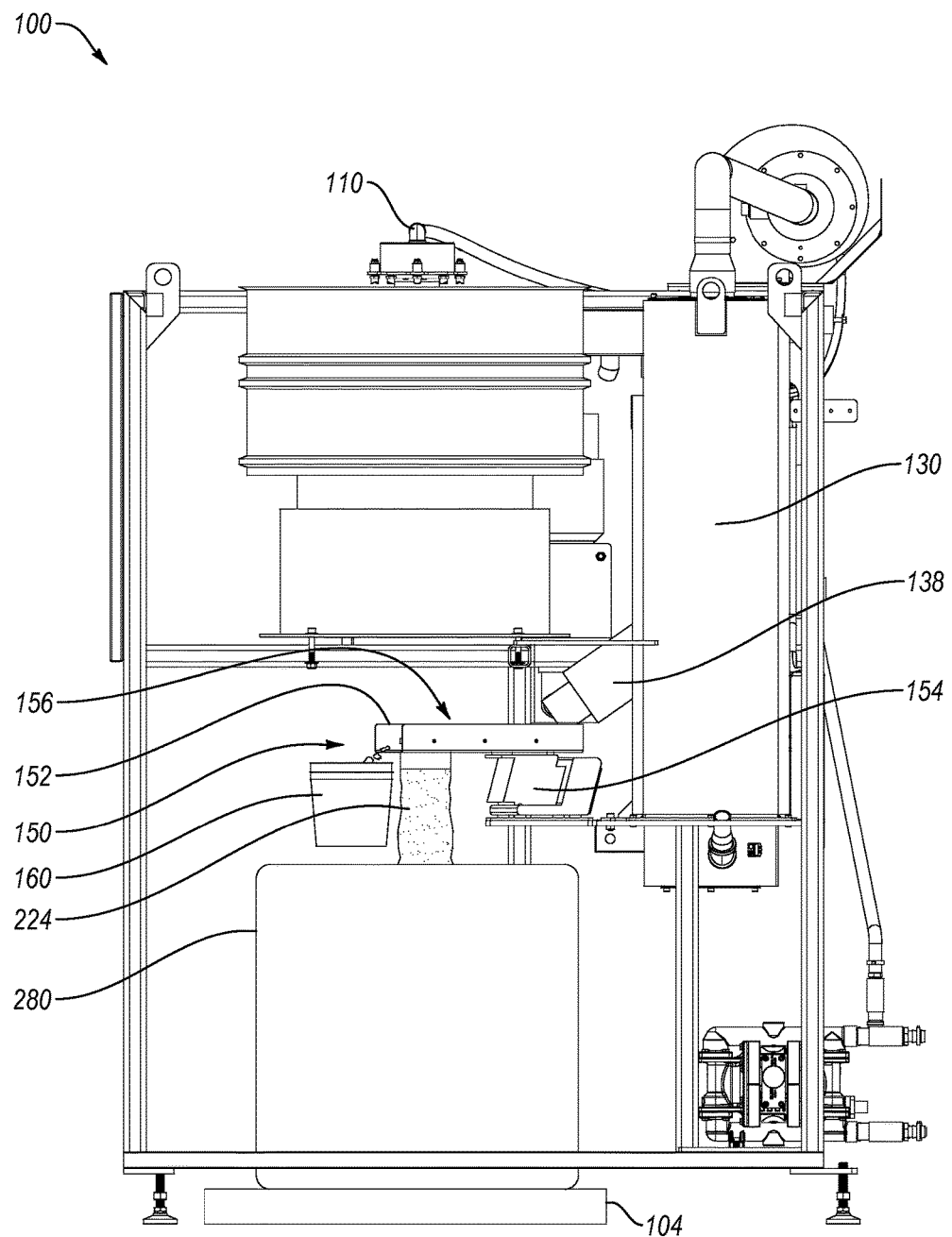
FIG. 3 is a side elevation view of the abrasive recycling system.

In the illustrated embodiment, with reference being made to FIG. 1, the abrasive recycling system 100 may include an inlet 110 through which the abrasive slurry 218 may enter, a drying apparatus 130 fluidly coupled to the inlet 110 and used to remove moisture from the slurry 218, and a secondary screening assembly 150 (see FIG. 3). The abrasive recycling system 100 may also include a slurry supply mechanism 101 having one or more pumps 102. In the illustrated embodiment, the abrasive recycling system 100 includes a first pump 102a configured to pump water from a water supply 108, such as a tank, to the intermediate collector 290, a second pump 102b configured to pump the slurry 218 from the intermediate collector 290 to the inlet 110, and a third pump 102c configured to pump fluid, such as water or air, into the intermediate collector 290 to agitate the slurry 218 contained in the intermediate collector 290. The abrasive recycling system 100 may also include a load cell 104 configured to measure the weight of recycled abrasive material 224 processed by the abrasive recycling system 100. Furthermore, a control box or computing device 106 can be in electronic communication with the pumps 102a, 102b, 102c via one or more wires, and may be employed to assist with controlling various aspects of the abrasive recycling system 100. Alternatively, the computing device 106 may be in wireless electronic communication with the pumps 102a, 102b, 102c to assist with controlling various aspects of the abrasive recycling system 100. The load cell 104 and computing device 106 will be described more fully hereinafter.

The inlet 110 may include an initial screen 120, such as a primary screen, onto which the abrasive slurry 218 is fed. The initial screen 120 may perform a primary screening of the slurry 218 to remove small objects and foreign material from the slurry 218, before the slurry 218 enters the drying apparatus 130, such as a dryer box. In the illustrated embodiment, the inlet 110 is positioned above the dryer box 130, such that gravity forces the slurry 218 thru the initial screen 120. The initial screened slurry 218 moves from the screen 120 to the dryer box 130 thru a channel 140. In this manner, the dryer box 130 is in fluid communication with the inlet 110. The dryer box 130 is adapted to utilize heat and/or air to remove moisture from the slurry 218 to thereby create a dry mixture of abrasive and foreign particles, such as pieces of the work piece 230 or the sacrificial underlayment 240. The dry mixture, i.e., dry abrasive and any remaining foreign particles, come out of the dryer box 130 onto the secondary screening assembly 150 where the dry mixture is further refined to obtain recycled abrasive material 224 (as shown in FIG. 3).

The pumps 102 can be configured to influence flow rate of slurry 218 into the abrasive recycling system 100. For example, one or more pumps 102 may be set to operate at a constant rate while one pump 102 is adjustable to influence the flow rate of the slurry 218 into the abrasive recycling system 100. In one embodiment, the second pump 102b and the third pump 102c may be set to operate at a contact rate and the first pump 102a can be adjustable. For example, pump 102b can be arranged to pump material from the intermediate collector 290 to the inlet 110 at a rate of two gallons per minute. The material that is pumped at a particular minute may be one quarter of a gallon of abrasive and one and three quarters of a gallon of water. In a subsequent minute, pump 102b may pump one gallon of abrasive and one gallon of water. In another minute, pump 102b may pump half a gallon of abrasive and one and a half gallons of water. Pump 102c may pump a fluid, such as water or air, into the collector 290 at a predetermined rate that is sufficient to agitate or otherwise mix the slurry 218. Agitation of the slurry 218 by the pump 102c may facilitate or otherwise assist pump 102b with pumping the slurry 218 into the inlet 110 by ensuring the abrasive 220 to water ratio is not too high and thereby clog the pump 102b.

The amount of abrasive 220 pumped from the intermediate collector 290 to the inlet 110 can be influenced by the amount of water pumped into the intermediate collector 290 by the pump 102a. For example, as more water is pumped into the intermediate collector 290 by pump 102a, the percentage of abrasive 220 in the slurry 218 decreases. Likewise, if less water is pumped into the intermediate collector 290 by pump 102a then the percentage of abrasive 220 in the slurry 218 increases. Thus, as the pump 102b moves a constant volume of material into the inlet 110, the amount of abrasive 220 transported by the pump 102b changes according to the percentage of abrasive 220 in the slurry 218. As the percentage of abrasive 220 in the slurry 218 increases (i.e., there is less water in the slurry 218 in the intermediate collector 290), there is more abrasive 220 being pumped into the inlet 110 by pump 102b. Likewise, as the percentage of abrasive 220 in the slurry 218 decreases (i.e., there is more water in the slurry 218 in the intermediate collector 290), there is less abrasive 220 being pumped into the inlet 110 by pump 102b. Therefore, adjustment of the pump 102a can influence the flow rate of abrasive 220 into the inlet 110.

Incorporated herein by reference in its entirety is U.S. Pat. No. 6,805,618 entitled WATER JET ABRASIVE RECYCLING APPARATUS AND METHOD. Therein is disclosed a slurry intake system that may be utilized in connection with the present invention in relation to the pumping of water by pump 102a into the intermediate collector 290, the agitation of the slurry 218 by pump 102c, and the removal of slurry 218 from the intermediate collector 290 by pump 102b. It will be appreciated that pumps 102a,b,c may be in electronic communication one with another via computing device 106 to facilitate the appropriate feeding, such as controlling the feed rate, of slurry 218 into inlet 110.

Figure 2A:
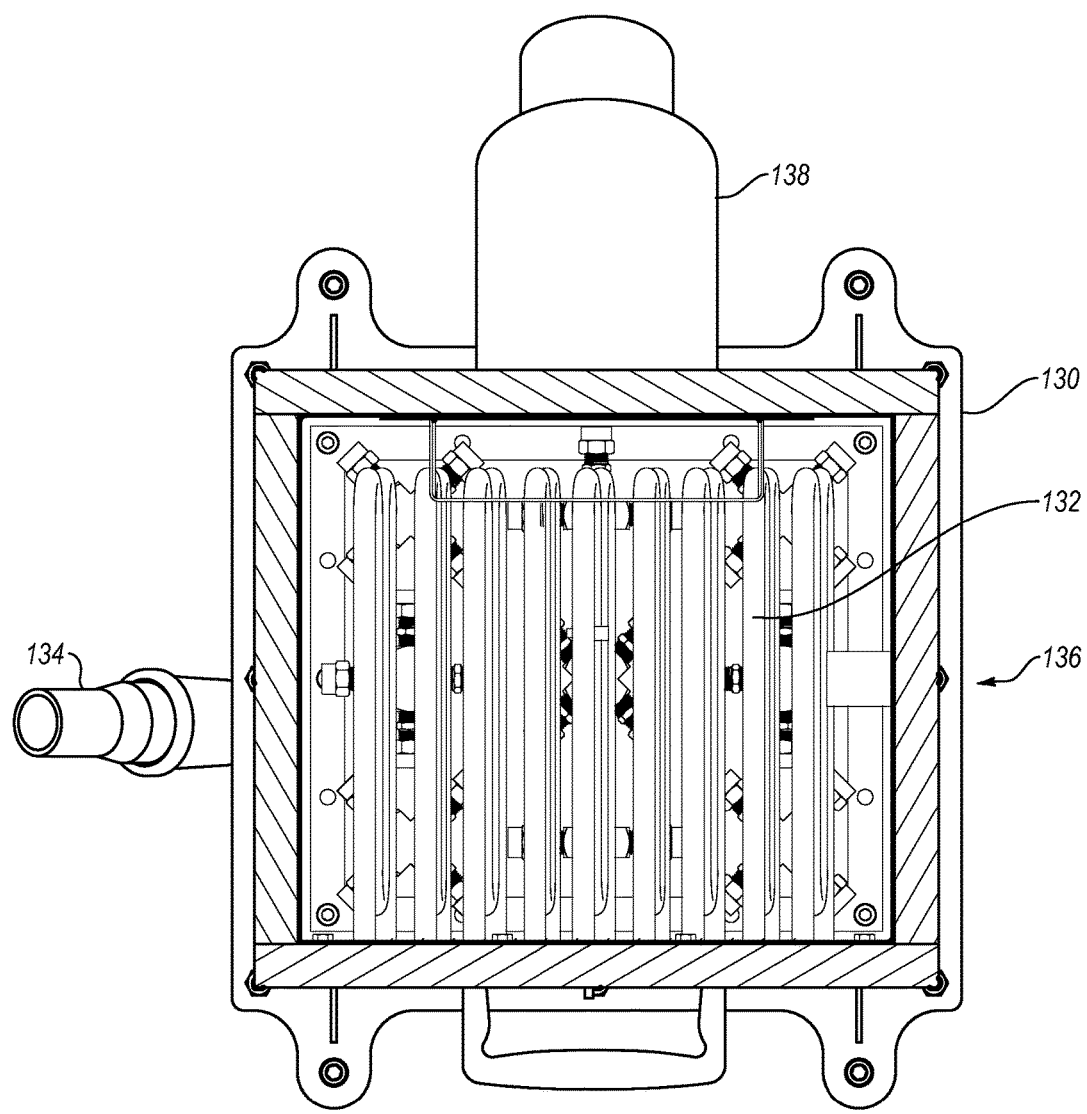
FIG. 2A is a top-down sectional view of a dryer of the liquid jet abrasive recycling system.
Figure 2B:
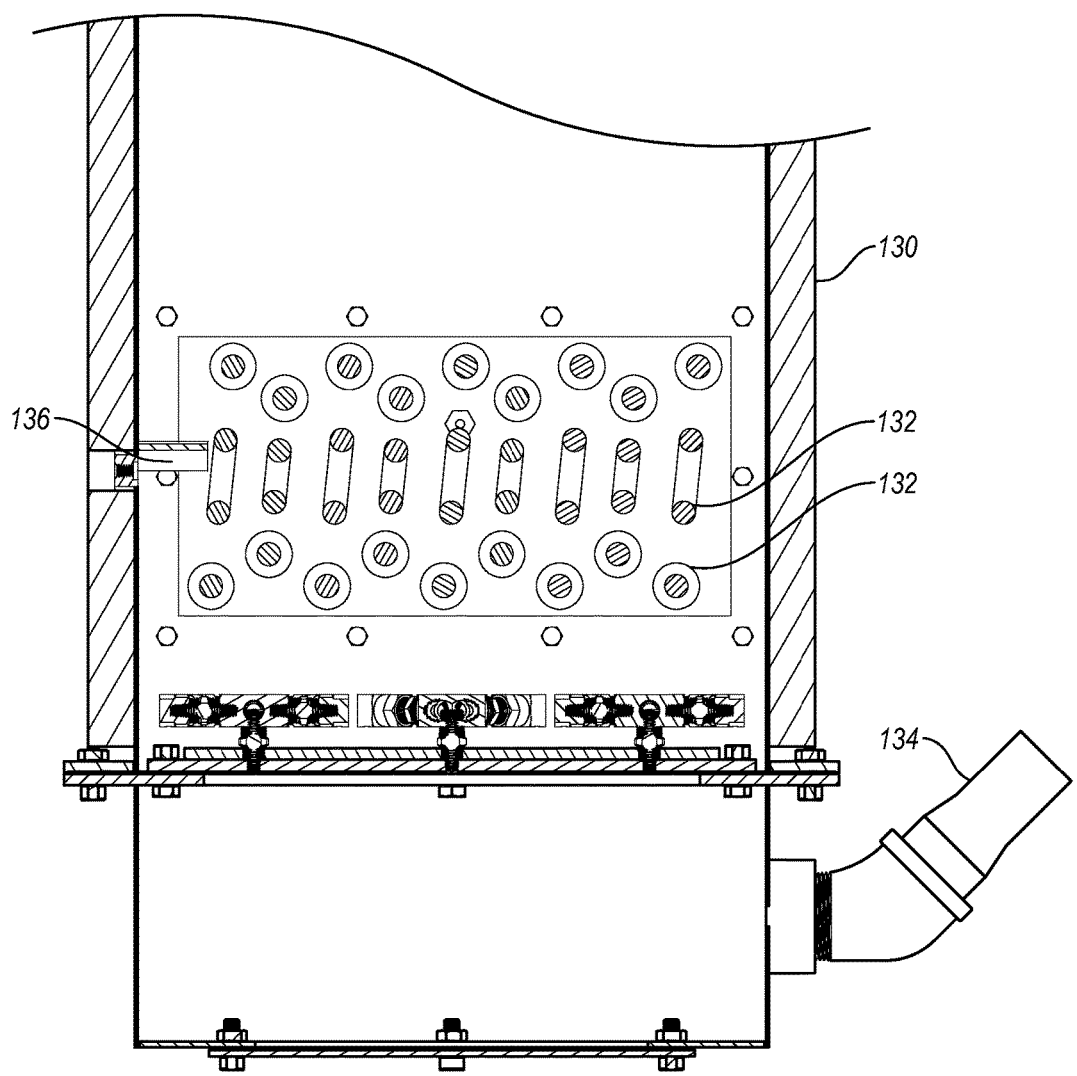
FIG. 2B is a side sectional view of a dryer of the liquid jet abrasive recycling system.

Various sensors can be employed to influence the operation of the slurry supply mechanism 101. Reference will now be made to FIG. 2A and FIG. 2B to discuss a first sensor 136 associated with the dryer box 130. As slurry 218 moves through the channel 140 from the initial screen 120 it enters the dryer box 130. In the dryer box 130, moisture can be removed from the slurry 218 by one or more of a series of heating elements 132 and air flow entering the dryer box 130 from a blower inlet 134. Heating elements 132 can be configured to heat the slurry 218 and surrounding air to help remove moisture from the slurry 218. In one embodiment, the heating elements 132 can be adjusted so as to heat the slurry 218 to a temperature of 300° F. In order to heat the slurry 218 to 300° F. it may be necessary to drive the heating elements 218 at a higher temperature to accommodate for the heat loss due to the lower temperature of the slurry 218. For example, in one embodiment, the heating elements 132 can be driven at 32f(F in order to maintain the slurry 218 at a temperature of 300° F.

The first sensor 136 may be employed to measure or sense various characteristics of the slurry 218 within the dryer box 130. For example, in one embodiment the first sensor 136 may be a thermocouple. In this embodiment, the sensor 136 is configured to measure the temperature of the slurry 218 within the dryer box 130. The sensor 136 can be positioned so as to remain in substantial contact with the abrasive 220 that has been dried from the slurry 218. In another embodiment, the sensor 136 may be a humidity sensor adapted to measure or sense the amount of moisture in the dryer box 130. It is contemplated that the sensor 136 can be positioned in various positions within the dryer box 130 so as to obtain desirable measurements.

The first sensor 136 can influence operation of the slurry supply mechanism 101. For example, if the first sensor 136 senses that the temperature of the abrasive 220 in the dryer box 130 is too high or that the humidity in the dryer box 130 is too high, this may indicate that there is not enough abrasive 220 entering the inlet 110. In this case, the slurry supply mechanism 101 can be altered to input less water from the water supply 108 into the intermediate collector 290 via pump 102a, thereby increasing the percentage of abrasive 220 in the slurry 218 contained in the intermediate collector 290. Alternatively, if the first sensor 136 senses that the temperature of the abrasive 220 in the dryer box 130 is too low or that the humidity in the dryer box 130 is too low, this may indicate that there is too much abrasive 220 entering the inlet 110 and the dyer 130 is not able to adequately remove moisture from the slurry 218 in an efficient manner. In this case, the slurry supply mechanism 101 can be altered to input more water from the water supply 108 into the intermediate collector 290 via pump 102a, thereby decreasing the percentage of abrasive 220 in the slurry 218 contained in the intermediate collector 290, which will input less abrasive 220 into inlet 110. Inputting less abrasive 220 into inlet 110, and thus into dryer 130, may allow the heating elements 132 to catch up and suitably heat the abrasive 220 as there is less abrasive 220 in the dryer 130.

The first sensor 136 can be electrically coupled via one or more wires to the computing device 106 to enable automatic adjustment of the supply of slurry 218 to the abrasive recycling system 100. The first sensor 136 may alternatively be in wireless electronic communication with the computing device 106. In one embodiment, the computing device 106 can include logic and be programmed to control the pump 102a thereby adjusting the flow rate of water from the water supply 108 into the intermediate collector 290. As discussed herein, modification of the amount of water in the intermediate collector 290 influences the amount of abrasive 220 that enters the inlet 110. In this manner, the slurry supply mechanism 101 can operate, at least in part, based upon at least one monitored characteristic that was sensed, measured or otherwise monitored by the first sensor 136. Furthermore, as the monitored temperature and/or the humidity level in the dryer 130 varies, small adjustments to the pump 102a can be made by the computing device 106 to achieve a more efficient recycling process. Also, it is contemplated that multiple sensors may be employed in the dryer box 136, such as for example, both a temperature sensor and a humidity sensor.

Reference being made to FIG. 3, a second sensor 104 may be employed to measure or monitor a characteristic of the abrasive recycling system 100. The second sensor 104 may be configured to measure or monitor the amount of recycled abrasive 224 recycled by the abrasive recycling system 100. In the illustrated embodiment, the abrasive recycling system 100 includes the secondary screening assembly 150. The secondary screening assembly 150 may include a tray 152 for receiving the dry mixture from the dryer box 130, a vibrating feeder 154 to help facilitate transport of the dry mixture along the tray 152, and a secondary screen 156, such as a 30 mesh screen, for example, that allows smaller abrasive particles to drop through into a collection bag, bin or other component 280. This collected material represents the finished recycled abrasive product and end goal of the abrasive recycling system 100. Any material too large to fall through the secondary screen 156 as the screen 156 is agitated by the vibrating feeder 154 will continue on and drop off the end of the tray 152 into a waste bin 160. It is contemplated that the tray 152 and vibrating feeder 154 can be replaced by a conveying system, such as an endless belt, to facilitate transport of the dry mixture from the dryer to the secondary screen 156.

In the illustrated embodiment, the second sensor 104 may be a weight measuring device, such as a load cell, adapted to measure or monitor the amount of recycled abrasive 224 that enters the collection bag 280. As shown, a collection bag 280 can be positioned on the second sensor 104 and positioned underneath the tray 152 so as to catch the recycled abrasive material 224 after it falls through the screen 156. In this manner, as the recycled abrasive material 224 enters the collection bag 280, the second sensor 104 can monitor a characteristic of the abrasive recycling system 100, and more specifically, the weight or amount of abrasive 224 recycled by the abrasive recycling system 100.

The second sensor 104 can influence the operation of the slurry supply mechanism 101 based on the characteristic monitored thereby. For example, in one embodiment, the second sensor 104 can be a load cell adapted to measure the weight of recycled abrasive 224 contained therein. The second sensor 104, like as described herein with reference to the first sensor 136, can be in electronic communication with the computing device 106 via one or more wires coupled between the second sensor 104 and the computing device 106. The second sensor 104 may alternatively be in wireless electronic communication with the computing device 106. The computing device 106 can include logic and/or be programmed to control the pump 102b thereby adjusting the flow rate of slurry 218 from the intermediate collector 290 to the abrasive recycling system 100. Specifically, once a predetermined weight is monitored by the second sensor 104 and transmitted to the computing device 106, the computing device 106 can be preprogrammed to terminate pumping of the slurry 218 from the intermediate collector 290 into the inlet 110, and furthermore terminate other aspects of the abrasive recycling system 100 so as to not harm the various other components thereof. In other words, the computing device 106 can terminate operation of the pump 102b, along with various other functioning elements of the abrasive recycling system 100, when a specified characteristic is monitored by the second sensor 104 (i.e., a specified weight is monitored). The control of the slurry supply mechanism 101, and hence, the abrasive recycling system 100, in this manner is helpful so as to not overfill a collection bag 280.

Reference being made to FIG. 4, a third sensor 114 may be employed to sense, measure or monitor a characteristic of the abrasive recycling system 100. More specifically, the third sensor 104 may be configured to measure or monitor the amount of fluid or slurry 218 at the initial screen 120. In one embodiment, the third sensor 114 can be a proximity sensor. In another embodiment, the third sensor 114 can be a float switch. In yet another embodiment, the third sensor 114 can be a connectivity sensor. In the illustrated embodiment, the third sensor 114 may be positioned adjacent to the initial screen 120 so as to monitor the level of fluid, slurry 218 or water adjacent to the initial screen 120. In this manner, as the third sensor 114 senses water, or other fluids, at a predetermined level adjacent to the initial screen 120, the third sensor 114 can monitor a characteristic of the abrasive recycling system 100, and more specifically, the level of fluid adjacent to the initial screen 120. Also disclosed are various flush tubes 112 adjacent to the inlet 110. The flush tubes 112 can be employed to deliver streams of water to the initial screen 120 to help clean or otherwise facilitate removal of material from the initial screen 120.

The third sensor 114 can influence the operation of the slurry supply mechanism 101 based on the characteristic monitored thereby. For example, in one embodiment, the third sensor 114 can be a float switch adapted to switch when the water, or other fluid, level at the initial screen 120 reaches a predetermined height. The third sensor 114, like as described herein with reference to the first sensor 136 and the second sensor 104, can be in electronic communication with the computing device 106 via one or more wires 116 coupled between the third sensor 114 and the computing device 106. The third sensor 114 may alternatively be in wireless electronic communication with the computing device 106. The computing device 106 can include logic and/or be programmed to control the pump 102*b* thereby adjusting the flow rate of slurry 218 from the intermediate collector 290 to the abrasive recycling system 100. For example, once the level of water or other fluid at the initial screen 120 reaches a certain height the third sensor 114 transmits this information to the computing device 106. The computing device 106 can be preprogrammed to terminate pumping of the slurry 218 from the intermediate collector 290 into the inlet 110, and furthermore terminate other aspects of the abrasive recycling system 100 so as to not harm the various other components thereof, once this information is transmitted by the third sensor 114. In other words, the computing device 106 can terminate operation of the pump 102*b*, along with various other functioning elements of the abrasive recycling system 100, when a specified characteristic is monitored by the third sensor 114 (i.e., the height of the water or other fluid at the initial screen is too high or otherwise exceeds a predetermined limit). The control of the slurry supply mechanism 101, and hence, the abrasive recycling system 100, in this manner is helpful so as to not cause too much water or slurry 218 to be positioned at the initial screen 120 thereby causing the excess water and/or slurry 218 to spill onto the ground.

As discussed herein, the first sensor 136, second sensor 104, and the third sensor 114 can be configured to monitor at least one characteristic of the abrasive recycling system 100, the sensors being in electronic communication with the slurry supply mechanism 101 through the computing device 106, and the slurry supply mechanism 101 operating, at least in part, based upon the monitored characteristic(s). The supply of slurry 218 to the abrasive recycling system 100 can be automatically adjusted by one or more sensors 104, 114, 136 transmitting information to the computing device 106 and in response thereto the computing device 106 controlling or otherwise influencing the operation of the slurry supply mechanism 101.

With reference being made to FIG. 1-FIG. 4, methodology corresponding to the operation of an abrasive recycling system 100 is described.

In one embodiment, a method for operating a liquid jet abrasive recycling system 100 in fluid communication with a liquid jet cutting tool 200 includes supplying a slurry 218 to the abrasive recycling system 100 by a pump 102*b*, evaporating liquid from the slurry 218 in a dryer 130, monitoring at least one characteristic of the abrasive recycling system 100 utilizing one or more sensors 104, 114, 136, and adjusting at least one of the following steps (1) supply of slurry 218, or (2) evaporating the liquid, based upon the monitored characteristic. The method may also include the step of collecting recycled abrasive 224 from the slurry 218 after evaporating liquid from the slurry 218. Also, the method may also include measuring the weight of the recycled abrasive 224 at the first sensor 104, such as a load cell. The method may also include measuring the temperature of the slurry 218 during the step of evaporating of liquid from the slurry 218, wherein the temperature is measured using the second sensor 136, such as a thermocouple. The method may also include measuring the moisture level of the slurry 218 during the step of evaporating of liquid from the slurry 218, wherein the moisture is measured using a sensor, such as a humidity level sensor. The method may also include measuring a slurry 218 fluid level before the step of evaporating liquid from the slurry 218 by utilizing a third sensor 114, such as a float switch. The step of adjusting may include automatically adjusting at least one of the following steps (1) supply of slurry 218, or (2) evaporating the liquid, based upon the monitored characteristic.

In one embodiment, the method for operating a liquid jet abrasive recycling system in fluid communication with a liquid jet cutting tool may include supplying a slurry 218 from the liquid jet cutting tool 200 to the abrasive recycling system 100, removing liquid from the slurry 218 to create recycled abrasive 224, monitoring at least one characteristic of the abrasive recycling system 100 utilizing one or more sensors 104, 114, 136, and automatically adjusting, based on the at least one monitored characteristic, the supply of the slurry 218 to the abrasive recycling system 100. According to this method, automatically adjusting can include stopping the supply of slurry 218 to the abrasive recycling system 100. Further according to this method, automatically adjusting can include modifying the supply of slurry 218 to the abrasive recycling system 100.

Although various aspects are illustrated and described herein with reference to specific embodiments, the aspects, in whole and in part, are not intended to be limited to the details shown. Rather, various modifications may be made in the details within the scope and range of equivalents of the claims and without departing from the invention.

What is claimed is:

1. A liquid jet abrasive recycling system, the system comprising:
    a slurry supply mechanism associated with a liquid jet cutting tool, the slurry supply mechanism configured to control the input of slurry from the liquid jet cutting tool into the liquid jet abrasive recycling system;
    a dryer in fluid communication with the slurry supply mechanism, the dryer configured to remove liquid from the slurry; and
    a sensor monitoring at least one characteristic of the abrasive recycling system, the sensor being in electronic communication with the slurry supply mechanism, wherein the slurry supply mechanism operates, at least in part, based upon the at least one monitored characteristic, wherein the sensor is associated with the dryer.

2. The liquid jet abrasive recycling system according to claim 1, wherein the liquid jet cutting tool includes an intermediate slurry storage reservoir.

3. The liquid jet abrasive recycling system according to claim 1, wherein the sensor measures temperature of the slurry in the dryer.

4. The liquid jet abrasive recycling system according to claim 1, wherein the sensor measures humidity inside the dryer.

5. A liquid jet abrasive recycling system, the system comprising:

a slurry supply mechanism associated with a liquid jet cutting tool, the slurry supply mechanism configured to control the input of slurry from the liquid jet cutting tool into the liquid jet abrasive recycling system;

a dryer in fluid communication with the slurry supply mechanism, the dryer configured to remove liquid from the slurry; and a sensor monitoring at least one characteristic of the abrasive recycling system, the sensor being in electronic communication with the slurry supply mechanism, wherein the slurry supply mechanism operates, at least in part, based upon the at least one monitored characteristic, wherein the sensor measures weight of recycled abrasive exiting the abrasive recycling system.

6. A liquid jet abrasive recycling system, the system comprising:

a slurry supply mechanism associated with a liquid jet cutting tool, the slurry supply mechanism configured to control the input of slurry from the liquid jet cutting tool into the liquid jet abrasive recycling system;

a dryer in fluid communication with the slurry supply mechanism, the dryer configured to remove liquid from the slurry;

a sensor monitoring at least one characteristic of the abrasive recycling system, the sensor being in electronic communication with the slurry supply mechanism, wherein the slurry supply mechanism operates, at least in part, based upon the at least one monitored characteristic; and a screen positioned between the slurry supply mechanism and the dryer.

7. The liquid jet abrasive recycling system according to claim 6, wherein the sensor detects a fluid level at the screen.

8. The liquid jet abrasive recycling system according to claim 6, wherein the at least one characteristic comprises at least one of the abrasive temperature in the dryer, the humidity level in the dryer, the weight of recycled abrasive that has exited the dryer, or the fluid level of the slurry at the screen.

9. A liquid jet abrasive recycling system, the system comprising:

a slurry supply mechanism associated with a liquid jet cutting tool, the slurry supply mechanism configured to control the input of slurry from the liquid jet cutting tool into the liquid jet abrasive recycling system;

a dryer in fluid communication with the slurry supply mechanism, the dryer configured to remove liquid from the slurry; and a sensor monitoring at least one characteristic of the abrasive recycling system, the sensor being in electronic communication with the slurry supply mechanism, wherein the slurry supply mechanism operates, at least in part, based upon the at least one monitored characteristic, wherein the operation of the slurry supply mechanism comprises terminating operation of the liquid jet abrasive recycling system.

10. A liquid jet abrasive recycling system, the system comprising:

a slurry supply mechanism associated with a liquid jet cutting tool, the slurry supply mechanism configured to control the input of slurry from the liquid jet cutting tool into the liquid jet abrasive recycling system;

a dryer in fluid communication with the slurry supply mechanism, the dryer configured to remove liquid from the slurry; and a sensor monitoring at least one characteristic of the abrasive recycling system, the sensor being in electronic communication with the slurry supply mechanism, wherein the slurry supply mechanism operates, at least in part, based upon the at least one monitored characteristic, wherein the operation of the slurry supply mechanism comprises adjusting a feed rate of slurry into the dryer.

11. A liquid jet abrasive recycling system, the system comprising:

a slurry supply mechanism associated with a liquid jet cutting tool, the slurry supply mechanism configured to control the input of slurry from the liquid jet cutting tool into the liquid jet abrasive recycling system;

a dryer in fluid communication with the slurry supply mechanism, the dryer configured to remove liquid from the slurry;

a sensor monitoring at least one characteristic of the abrasive recycling system, the sensor being in electronic communication with the slurry supply mechanism, wherein the slurry supply mechanism operates, at least in part, based upon the at least one monitored characteristic; and a load cell positioned under the dryer, wherein the load cell is configured to determine the weight of the abrasive exiting the dryer.

12. The liquid jet abrasive recycling system according to claim 1, further comprising a computing device in electronic communication with the sensor and slurry supply mechanism.

13. The liquid jet abrasive recycling system according to claim 12, wherein the computing device controls a feed rate of abrasive to the dryer.

14. A liquid jet abrasive recycling system in fluid communication with a liquid jet cutting tool, the system comprising:

a slurry supply mechanism configured to control a feed rate of slurry;

a dryer in fluid communication with the slurry supply mechanism, the dryer configured remove liquid from the slurry; and a sensor monitoring at least one characteristic associated with the abrasive recycling system, wherein the slurry supply mechanism operates, at least in part, based upon the at least one characteristic, wherein the at least one characteristic is one of the following:

the temperature inside the dryer, the humidity level inside the dryer, the weight of the dried abrasive from the liquid jet abrasive recycling system, or the depth of the slurry at a screen positioned above the dryer.

15. A liquid let abrasive recycling system in fluid communication with a liquid jet cutting tool, the system comprising:

a slurry supply mechanism configured to control a feed rate of slurry;

a dryer in fluid communication with the slurry supply mechanism, the dryer configured remove liquid from the slurry; and a sensor monitoring at least one characteristic associated with the abrasive recycling system, wherein the slurry supply mechanism operates, at least in part, based upon the at least one characteristic, wherein the operation of the slurry supply mechanism comprises adjusting a feed rate of the slurry.

16. A liquid jet abrasive recycling system in fluid communication with a liquid jet cutting tool, the system comprising:
- a slurry supply mechanism configured to control a feed rate of slurry;
- a dryer in fluid communication with the slurry supply mechanism, the dryer configured remove liquid from the slurry;
- a sensor monitoring at least one characteristic associated with the abrasive recycling system, wherein the slurry supply mechanism operates, at least in part, based upon the at least one characteristic; and
- a load cell positioned below the dryer, wherein the load cell is configured to determine the weight of the abrasive exiting the dryer.

17. The liquid jet abrasive recycling system according to claim 14, further comprising a computing device in electronic communication with the sensor and slurry supply mechanism, wherein the computing device controls a feed rate of the slurry.

18. A method for operating a liquid jet abrasive recycling system in fluid communication with a liquid jet cutting tool, the method comprising:
- supplying a slurry to the abrasive recycling system;
- evaporating liquid from the slurry;
- monitoring at least one characteristic of the abrasive recycling system;
- adjusting at least one of the following steps (1) supply of slurry, or (2) evaporating the liquid, based upon the monitored characteristic; and
- measuring the weight of the recycled abrasive.

19. The method according to claim 18, further comprising the step of collecting recycled abrasive from the slurry after evaporating liquid from the slurry.

20. A method for operating a liquid jet abrasive recycling system in fluid communication with a liquid jet cutting tool, the method comprising:
- supplying a slurry to the abrasive recycling system;
- evaporating liquid from the slurry;
- monitoring at least one characteristic of the abrasive recycling system;
- adjusting at least one of the following steps (1) supply of slurry, or (2) evaporating the liquid, based upon the monitored characteristic; and
- measuring the temperature of the slurry during the step of evaporating of liquid from the slurry.

21. A method for operating a liquid jet abrasive recycling system in fluid communication with a liquid jet cutting tool, the method comprising:
- supplying a slurry to the abrasive recycling system;
- evaporating liquid from the slurry;
- monitoring at least one characteristic of the abrasive recycling system;
- adjusting at least one of the following steps (1) supply of slurry, or (2) evaporating the liquid, based upon the monitored characteristic; and
- measuring the moisture level of the slurry during the step of evaporating of liquid from the slurry.

22. A method for operating a liquid jet abrasive recycling system in fluid communication with a liquid jet cutting tool, the method comprising:
- supplying a slurry to the abrasive recycling system;
- evaporating liquid from the slurry;
- monitoring at least one characteristic of the abrasive recycling system;
- adjusting at least one of the following steps (1) supply of slurry, or (2) evaporating the liquid, based upon the monitored characteristic; and
- measuring a slurry fluid level before the step of evaporating liquid from the slurry.

* * * * *